R. B. HARTMAN.
SECONDARY REINFORCEMENT FOR CONCRETE STRUCTURES.
APPLICATION FILED APR. 15, 1912.
1,233,053.
Patented July 10, 1917.
4 SHEETS—SHEET 1.
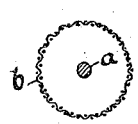 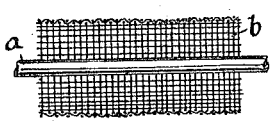 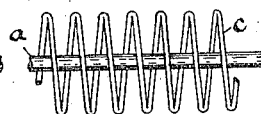 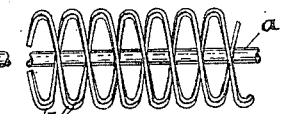
Fig. 1   Fig. 2   Fig. 3   Fig. 4
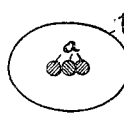 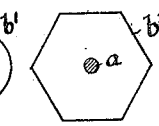 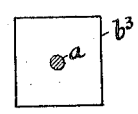 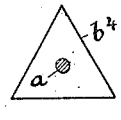 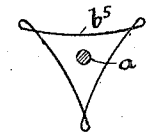 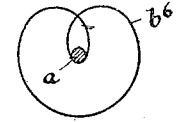
Fig. 5   Fig. 6   Fig. 7   Fig. 8   Fig. 9   Fig. 10
 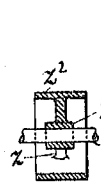  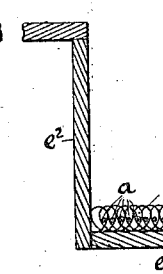 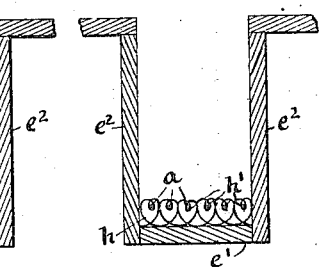
Fig. 11   Fig. 12   Fig. 13   Fig. 14   Fig. 15
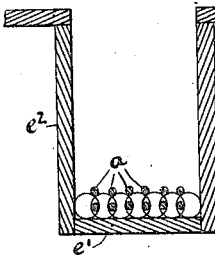 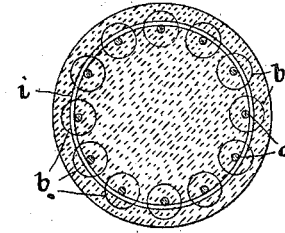 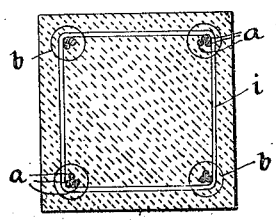
Fig. 16   Fig. 17   Fig. 18
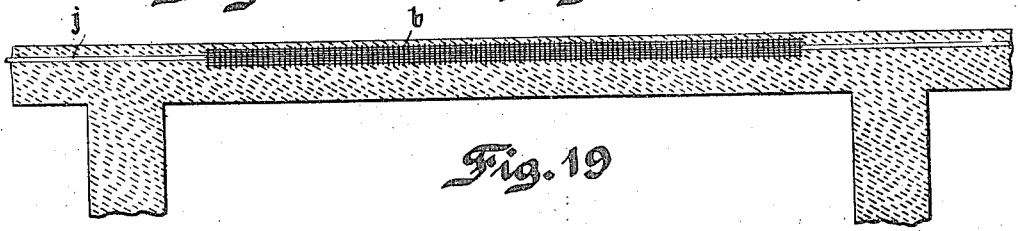
Fig. 19
Witnesses
C. Cramer
Rudolph B. Hartman, Inventor
By George Witmore Colles, Attorney R. B. HARTMAN.
SECONDARY REINFORCEMENT FOR CONCRETE STRUCTURES.
APPLICATION FILED APR. 15, 1912.

1,233,053.

Patented July 10, 1917.
4 SHEETS—SHEET 2.

Witnesses
C. Cramer.
E. Reineck

Rudolph B. Hartman, Inventor
By
[signature]
Attorney

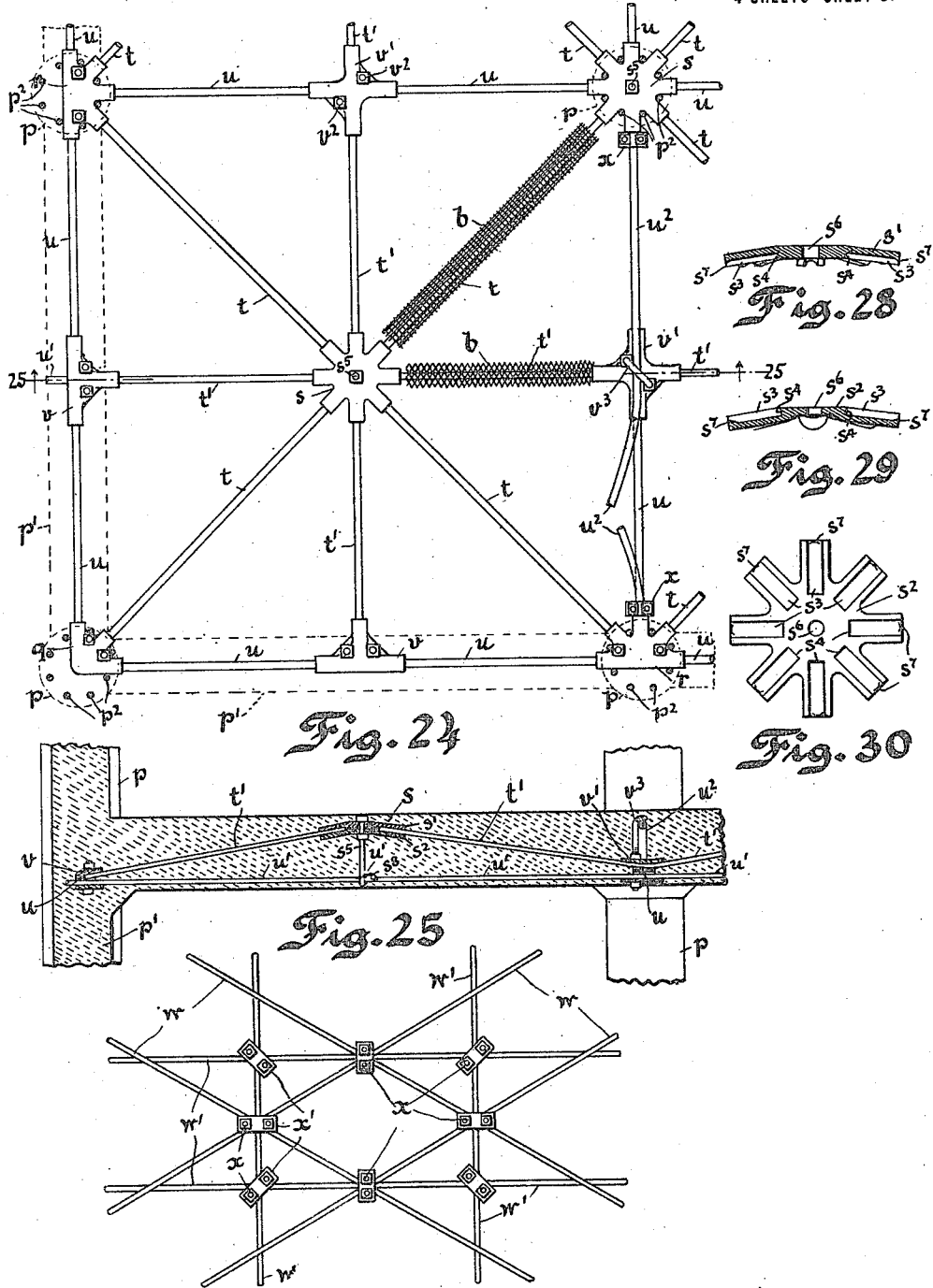

R. B. HARTMAN.
SECONDARY REINFORCEMENT FOR CONCRETE STRUCTURES.
APPLICATION FILED APR. 15, 1912.
1,233,053.
Patented July 10, 1917.
4 SHEETS—SHEET 4.
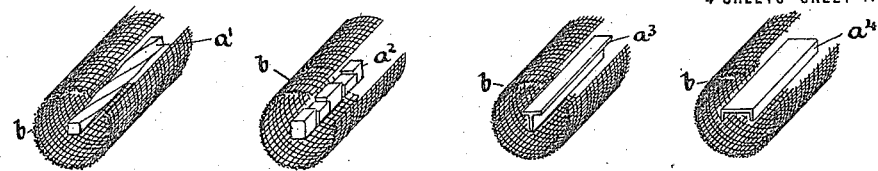
Fig. 32  Fig. 33  Fig. 34  Fig. 35
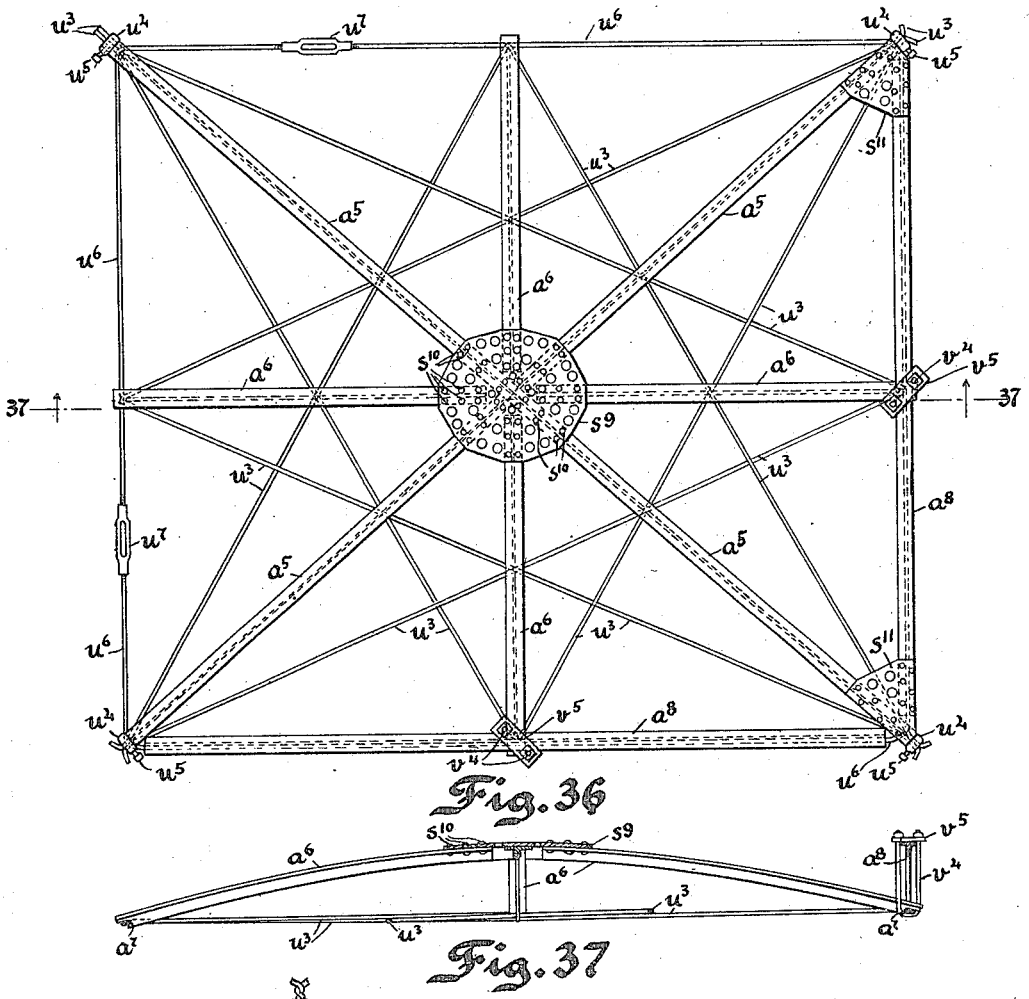
Fig. 36
Fig. 37
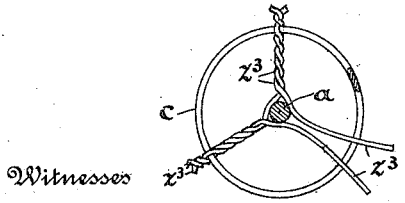
Fig. 38
Witnesses
C. Cramer.
I. Loeb.
Rudolph B. Hartman, Inventor
By George Wetmore Colles
Attorney

UNITED STATES PATENT OFFICE.

RUDOLPH B. HARTMAN, OF MILWAUKEE, WISCONSIN.

SECONDARY REINFORCEMENT FOR CONCRETE STRUCTURES.

1,233,053.   Specification of Letters Patent.   Patented July 10, 1917.

Application filed April 15, 1912. Serial No. 690,980.

*To all whom it may concern:*

Be it known that I, RUDOLPH B. HARTMAN, of Milwaukee, Wisconsin, have invented certain Secondary Reinforcements for Concrete Structures, of which the following is a specification.

In my former application, Serial Number 369,763, filed April 23, 1907, which was a division of my original application, Serial Number 288,068, filed November 18, 1905, I have disclosed my discovery of some of the reasons for failure in reinforced concrete together with my invention of means for providing against such failures by a suitable disposition of a small addition of metal and thereby so strengthening the beam or other elements concerned as to enable the same effective resistance to be obtained with a much smaller total quantity of metal than would otherwise be necessary; and the present application concerns a still further development of such means, which will effect a correspondingly greater saving of metal. To enable the meaning of this statement, and of the following specification, to be understood, it will be necessary to resume briefly the nature of the former invention.

The stresses in any structural element subjected to tension, compression, flexure or any other stress are, as shown and set forth, for example, in the *Bulletin of the University of Wisconsin* #148 *Engineering Series*, volume 3 No. 4, pages 319 to 394, of an extremely complex nature and by no means of the simple and unidirectional quality which has heretofore generally been assumed by engineers. This, of course, is true as well for concrete as for other materials, but for reinforced concrete it is still further complicated by the discreteness or discontinuity of the material. We are here dealing with a material having a high tenacity embedded in and more or less united with another material having a very low resistance in tension but a considerable resistance in compression. It has been customary in calculating the strength of structural elements to assume a tensile strength of the metal equal to the safe load which would be allowed it were the metal used alone; yet, as a matter of fact, this assumption is utterly fallacious and false, for the reason that circumstances never permit the metal to reach the maximum safe loading which is allowed to it by the constructor. Long before such a tensile stress is reached the beam fails in another manner than by the breakage of the metal, viz. by the concrete releasing its hold thereon; or in other words, the concrete breaks away from the metal and acts separately. It will be obvious that it is useless to reckon on a larger tensile strength for the metal than that at which the concrete can retain its grip thereupon.

The initial failure of the concrete is found to be marked by a network of microscopic or ultramicroscopic cracks, which mark the surface along which, with any further stress, the concrete will fail; and my former invention, hereinabove referred to, consisted briefly in providing a secondary meshwork of metal in the neighborhood of the reinforcement which serves to prevent the formation and extension of these cracks, or in other words acts to uniformly distribute this secondary stress through the concrete, the uniform distribution of which leads to the formation of these cracks. This secondary reinforcing meshwork, by preserving the integrity of the concrete immediately adjacent to the main reinforcing bars, serves to preserve the grip of the concrete upon the latter and therefore to permit the transferring to them of a much higher portion of the main tensional stress than would otherwise be possible.

It is the object of the present invention to improve the disposition of the secondary reinforcement over that heretofore disclosed by me, and more particularly by completely inclosing the reinforcing rod in a secondary reinforcement which may be a meshwork or a circular metal coil adapted to combine the concrete and prevent its flow away from the rod. This is entirely independent of and distinct from the circular or ring-reinforcement of columns, which has been heretofore used surrounding the reinforcement-bars as a whole and alleged to prevent flowage of concrete from the center of the column toward the outside.

I further aim by my novel construction to provide practical means for supporting the primary or secondary reinforcing elements in proper relation to each other during construction.

I further aim to provide special means for supporting narrow concrete slabs and beams by a special arch or compression reinforcement.

My invention further comprises the particular constructions and combinations of parts hereinafter described and more particularly set forth in my claims.

I have hereinbelow illustrated the principles of my invention by a number of specific examples or illustrations thereof, reference being had to the accompanying drawings, wherein Figure 1 is a transverse, and Fig. 2 a longitudinal section of a simple form of my improved secondary reinforcement as applied to a single rod in either compression or tension;

Figs. 3 and 4 are side views of other examples of my improved secondary reinforcement as applied to a single rod;

Figs. 5 to 10 inclusive are diagrammatic transverse sections of other forms of my improved secondary reinforcement;

Figs. 11 and 12 are respectively a front view and an axial section of a spider or support for centering the secondary reinforcement with respect to the rod;

Figs. 13, 14, 15 and 16 are transverse sections of forms for reinforced concrete beams, showing the main reinforcements thereof as provided with various dispositions of secondary reinforcements;

Figs. 17 and 18 are transverse sections of columns showing the application of my improvement to the reinforcement thereof;

Fig. 19 is a longitudinal section through a beam or floor-slab, illustrating the application thereto of my secondary reinforcement in the case of a compression-rod;

Figs. 24 and 25 illustrate in plan and in transverse central section on the plane 25 a truss-frame or disposition of arch-bar reinforcements for a floor-panel;

Figs. 28 and 29 are central transverse sections respectively of the top-half and bottom-half of one of the rod-holding spiders of Figs. 24 and 25;

Fig. 30 is a plan view of the element shown in Fig. 29;

Fig. 31 shows the central portion of another form of compression-reinforcement for a floor-panel;

Figure 20:
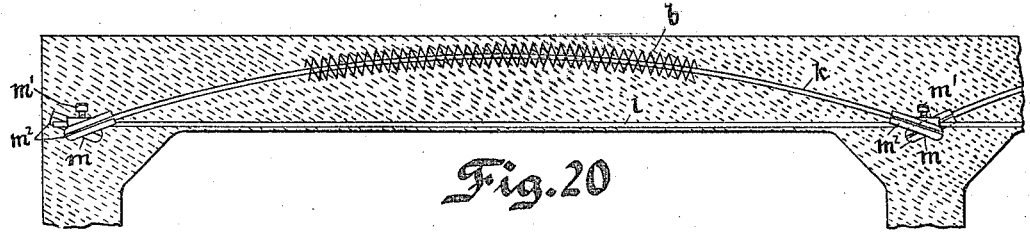
Fig. 20 is a longitudinal section through another form of the same.

Figs. 32 to 35 inclusive, are perspective views, somewhat schematic, of different arrangements showing my secondary reinforcement as employed with deformed and structural bars; the secondary reinforcement being partly broken away;

Fig. 36 inclusive is a plan-view of a compression-reinforcement-frame for another floor-panel;

Fig. 37 is a transverse section through the same on the plane 37; and

Fig. 38 shows a simpler form of spider or support than that of Figs. 11 and 12 for centering the secondary reinforcement with respect to the rod.

In these drawings the same reference character refers to the same part wherever used.

My secondary reinforcement embodies in its simplest form a combination with the main reinforcement-rod $a$ of an enveloping network or hoop-reinforcement, which in Figs. 1 and 2 is shown as a cylindrical wire-mesh $b$; in Fig. 3 as a helically turned rod or wire $c$; and in Fig. 4 as a combination $d$ of two such helically turned wires or rods, forming substantially a meshwork whose meshes are oblique to the axis. Although shown in Figs. 1 to 4 as cylindrical, it is not necessarily so, as it may assume an elliptical form $b'$, a polygonal form $b^2$, a square form $b^3$, a triangular form $b^4$, a looped form $b^5$, or a cardioid form $b^6$, as shown, by way of example merely, in Figs. 5, 6, 7, 8, 9 and 10 respectively. In Fig. 5 I have also shown by way of example three rods $a$ laid side by side, and in Fig. 18 three such rods grouped together. The essential feature of all of these is that the individual rod or group of rods is completely inclosed by the secondary reinforcement in such manner as to accomplish two things: first, a uniform distribution of the contractile stress upon the rods, thereby preventing the cracks hereinabove referred to (which was partially accomplished by my former form of the reinforcement); and secondly, the prevention of outward flow of the concrete, which outward flow is known to be a conspicuous factor in the failure of concrete members under compression, and which I have found is also a factor in the failure of that portion of a concrete member which contains metal rods under tension, such outward flow tending to weaken the hold of the concrete upon the rod.

The secondary reinforcement may accomplish a third object as illustrated in Figs. 13, 14, 15 and 16, which show the disposition of the reinforcement-rods $a$ in a beam-form comprising a bottom $e'$ and sides $e^2$, said rods $a$ being supported by suitable means such as a stirrup $f$. In this case the reinforcing cages $b$ (this letter here symbolizing any of the forms of Figs. 1 to 10 above described) may simply be hung upon said rods $a$ or they may be strung upon the stirrup $f$ in the case of a wire-mesh. It will be noted that in this case the reinforcing cases $b$ may rest upon the rods $a$, and therefore it is not necessary that the latter be out of contact therewith, and as a matter of fact this may conceivably be a better disposition than the one where the cage is disposed concentrically with the rod, because the principal direction of the flow of concrete would be toward the nearest side of the beam, to wit the bottom thereof, and therefore the greatest protection of the secondary reinforcement should be exercised upon that side. Thus the problem is solved of readily and easily supporting the secondary reinforcement, which was left unsolved in my former invention hereinbefore cited.

In addition to the above-mentioned objects a fourth object may be accomplished by the secondary reinforcement as this is shown in Figs. 14, 15 and 16, which represent different forms of laterally deployed mesh-work, which provides simultaneously a secondary reinforcement and also a supporting and spacing means for the rods, and enabling me to dispense with stirrups $f$ or similar supports. In Fig. 14 the secondary reinforcement comprises a plurality of laterally deployed helical wires $g$, between any two successive links of which are formed spindle-shaped openings through which pass the rods $a$. In Fig. 15 the wires $h$ extend transversely in a series of continuous joined cardioid forms having central loops $h'$ in which hang the rods $a$, thus spacing them apart from the sides of the reinforcement. In Fig. 16 is shown a plurality of longitudinally disposed helical wires $c$, the same as in Fig. 3, the coils of these wires, however, interlocking to form spindle-shaped apertures or passages through which are inserted the rods $a$, and a second row of rods $a$ may rest in the spandrels over the coils, as shown.

For keeping the secondary reinforcement cage $b$ in proper relation to the reinforcement bar which it protects, I may provide any suitable device, such as the ring-spacer $z$ shown in Figs. 11 and 12, having a perforated hub $z'$ through which the bar $a$ passes and a rim $z^2$ adapted to pass through the cage $b$.

In Figs. 17 and 18 are shown cross-sections of a round and a square column respectively, each of which has longitudinal main reinforcements $a$ (each of which may consist of a single rod or a group of rods) each inclosed in a secondary reinforcement-cage $b$, which may be any of the forms shown in Figs. 1 to 10, and the usual ring-reinforcement $i$, which incloses the column as a whole. It is to be understood that my secondary reinforcement, while it takes a ring-form, is wholly independent of the reinforcement provided or intended to be provided by the ring-bars $i$, which are properly a main reinforcement, whose function or supposed function is to check the outward flow of concrete due to the compression of the column en masse, and has nothing to do with the maintenance of the integrity of the concrete or the prevention of flowage from the individual rods.

As I have hereinabove stated, the secondary action which results in radial and tangential stresses with respect to the individual reinforcing rods takes place whether the rod be in tension or compression, but it is greater where the rod is in compression, because here the endwise en masse compression of the concrete is added to the secondary stress and in the former case is subtracted therefrom. Hence my invention is especially useful in cases where the metal is used to sustain compression. I have found that in some cases metal compression-reinforcements can be used to good advantage where assisted by my secondary reinforcement, where without it such use would be impracticable. An instance of this is shown in Fig. 19, which illustrates in section a shallow beam or floor-slab in a case where the depth is narrowly limited by structural exigencies or requirements of the building-specification. In this case the floor or beam may be so shallow that it is incapable of self-support without a compression-reinforcement; but the support of reinforcing rods at exactly the proper distance from the upper surface of the beams or slabs is a practical problem which, to the best of my knowledge, has not yet been solved. It will be understood that if the rods are too high, or are close to or project above the surface, their function as compression-rods will be impaired or nullified, since they will have no hold on the concrete, while on the other hand, if they are too low, their function as compression-rods is again impaired, and the amount of sag which will suffice to nullify their function will of course be very small on a shallow beam or slab. Furthermore, the problem of supporting such rods at the top of the beam or slab is a very different one from that at the bottom, because all the concrete has to be poured over and sink between them, and this and the running of carts and men over the unfinished floor makes it impracticable to maintain them without displacement; but when provided with my secondary reinforcement-cage, the exact position of the rods becomes less a matter of consequence because of the action of said cage in reaching out, so to speak, to the surrounding concrete beyond the rod itself and uniting it thereto and therewith. If the rod is above its proper position the cage unites it to the concrete below, and if it is below its proper position, the cage unites it to the concrete above.

Figures 21, 23:
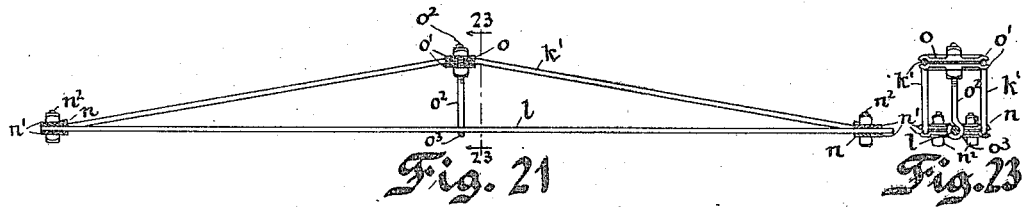
Figs. 21 and 22 are respectively a longitudinal central section and a plan-view through an arch or truss-frame for beam or slab-reinforcement.
Fig. 23 is a transverse section of the truss-frame of Figs. 20 and 21 taken on plane 23.

A further development of this idea of forming a means of support for compression-rods at the proper elevation is illustrated in Fig. 20, in which the compression-rod $k$ is convexed upward or arched, as shown, and it may be given exactly the proper amount of bend to hold its shape by itself and thus rest with its ends upon the column rods or some other suitable support placed for it; or, on the other hand, its ends may be bound to the ends of a tension-rod $l$ which extends straight along the bottom of the beam, in which case it is not necessary to give the rod $k$ a permanent bend, but it is placed in a jig or form along with the rod $l$ and after uniting it thereto, the two rods form together a simple arch-truss form, illustrated in Fig. 21. I prefer to make the joint between the rods $k$ and $l$ by suitable socket-casings $m$, provided with means such as set-screws $m'$ for clamping the rod $l$ (which may extend farther to the next span) and a pair of sockets $m^2$, disposed at an angle to each other, for receiving the ends of the rods $k$ of adjacent spans. It will be observed that the member $m$ forms a sort of abutment for the rod $k$, and even where there is no similar rod on the adjacent span to take the thrust of the rod $k$ the empty socket on the casting $m$ presents a large surface to the concrete transverse to the direction of thrust. The socket and abutment-member $m$ may also be used where the rods $k$ are merely bent as hereinabove suggested and the rods $l$ are omitted. The rod $k$, as well as the rod $l$, may or may not be provided with the secondary reinforcement cage $b$ as shown.

Figure 22:
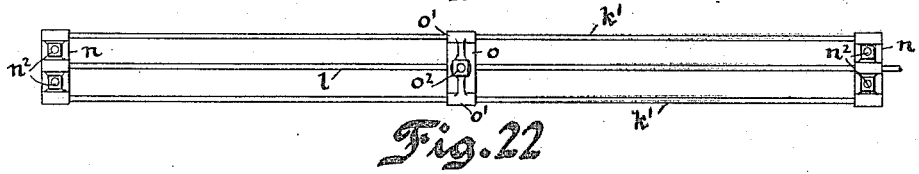

Figs. 21, 22 and 23 inclusive illustrate a form of compression-bar frame suitable for beams and slabs which is adapted to stand alone upon the form without further support. A pair of arched or compression-rods $k'$, which are bent in an angular shape, are united at their middle and ends by clips $n$ and $o$, and a third straight bar $l$, disposed midway between the bars $k'$, is likewise united thereto frictionally by the clips $n$, said clips being preferably made in two halves $n'$ divided along the axes of the bars $k$ and $l$ and provided with shallow semi-cylindrical recesses which, when the two halves are clamped together by the bolts $n^2$, form sockets for said bars $k'$ and $l'$ in which they are frictionally secured. The middle clip $o$ is likewise made in two halves $o'$ (see Fig. 23) but has only two such sockets, and the bolt $o^2$ which holds the two halves together, as shown in Fig. 23, may extend downwardly and be provided with a hooked end $o^3$ engaging the member $l$ midway of the latter and thus forming a medial joint between the three elements.

The same principle may be extended to the formation of a whole floor-panel, as illustrated in Figs. 24 and 25, especially in the flat or beamless system of construction, where very thin slabs are desired. Fig. 24 represents a floor panel at one corner of a floor, supported by columns $p$ and bounded by walls or beams $p'$ on two sides only, wherefrom it will be readily apparent how the same construction may be applied to a flooring-panel bounded on all sides by beams, or on one or no sides. Fig. 25 shows a transverse section through the frame and floor on the medial plane 25. I provide over each column a radial armed spider, such as $q$, $r$ and $s$, according as the panel is on the corner, on one edge, or in the middle of the floor; and the upright column-reinforcement-bars $p^2$ may be so disposed as to pass between the arms of said spider, as shown. Correspondingly, in the center of each panel midway between the columns, I provide an eight-armed spider $s$. As shown in the detailed views, Figs. 28 to 30, the spider $s$ is formed in two parts, $s'$ and $s^2$, divided by the axes of the reinforcing rods along a conical or pyramidal surface, said halves having semi-cylindrical recesses $s^3$ therein, terminated by abutment faces $s^4$, said recesses forming, when the halves are united, as by a central bolt $s^5$ passed through holes $s^6$ therein, sockets for the ends of the rods $t$ and $t'$.

In order to grip the ends of each of the rods in its socket, each of the semicylindrical recesses $s^3$ may have on its free end a snug or projection $s^7$, which makes the normal size of the entrance to the socket therefore slightly smaller than the size of the rod, whereby in gripping up the several rods the individual arms are caused to yield and press frictionally upon the sides of each of the members $t$ and $t'$ and thus hold it in its place, and if necessary the snugs $s^7$ may be given thereby enough edge to bite into the metal. The socket-castings $q$ and $r$ may be formed in the same way as the socket-piece $s$ with the unnecessary arms omitted; or the same castings $s$ may be used in place of the members $q$ and $r$, leaving empty sockets. The form of the member $s$ is, it will be observed, such as to distribute the end-thrust of the rods radially over a wide area in the concrete. The sockets $s$ over the column-ends are, of course, disposed with the apex downwardly, and those between the columns with the apex upwardly as shown in Fig. 25. In addition to the arch-reinforcement bars $t$, which extend diagonally from the columns to the center of each panel, straight tension-bars $u$ are employed extending from column to column and forming ties for the thrust of the compression-members $t$; and also compression-bars $t'$ extending parallel to the center lines of the columns from the center of the panel to the middle points of said bars $u$, to which they are connected by clips $x$ (as in Figs. 26 and 27), or socket-pieces $v$ and $v'$, as shown. The lateral thrust of the bars $t'$ is taken by bars $u'$ parallel to the bars $u$ and immediately under the bars $t'$, and the bars $u'$ may be tied to the middle socket-member $s$ by an extension on the bolt $s^5$, which has a hooked end $s^8$ engaging the two bars $u'$ at their crossing point. The vertical thrust which is transferred by the arch-bars $t'$ from the center to the side of the panel, is in its turn transferred to the columns in cases where there is no beam, wall or other support immediately below it, as in the beamless construction, by means of secondary arch-bars $u^2$ which are disposed immediately over the bars $u$ and are connected to the ends thereof by clips $x$, and support the bars $t'$ by suitable suspenders; for example, the bolts $v^2$ which unite the two parts of the clip $v'$ may be replaced by a U-bolt $v^3$ passing over the arch-bar $u^2$ as shown. To avoid unnecessary complexity of the drawing the secondary arch-bar $u^2$ is shown only in one place, on the right of Fig. 24, and in section on the right of Fig. 25, and it is shown as broken at one point and the ends turned aside to show the bar $u$ directly under it.

Thus I provide a very strong and rigid thrust-framework, without the use of anything but plain bars and a few simple castings. The ends of the reinforcing-bars may, of course, where desired, be threaded into the castings, but this, on account of the extra labor involved in screwing them up, I consider inadvisable in most cases.

Figure 26:
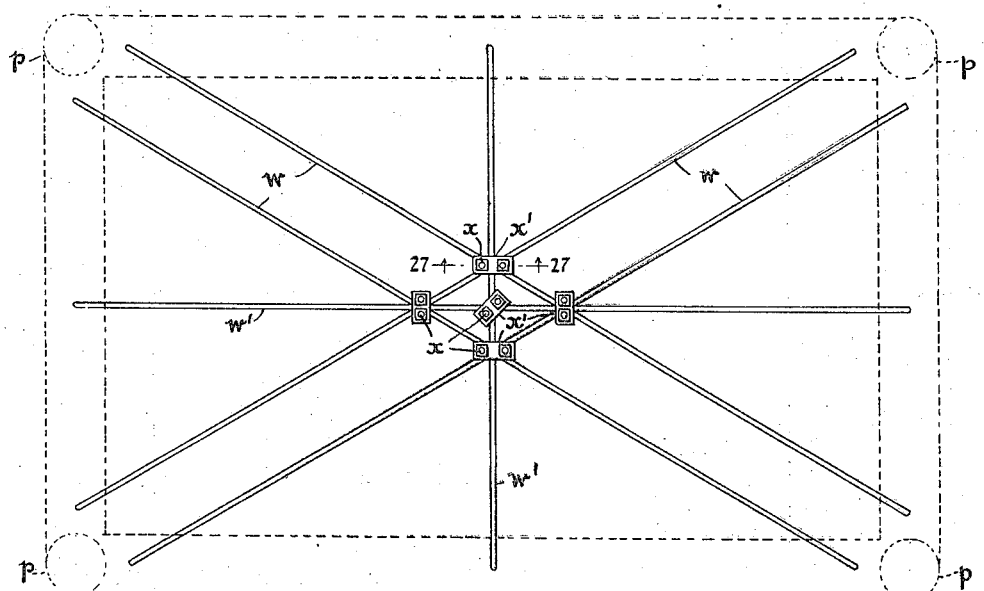
Fig. 26 is a plan-view of another arrangement of arch or compression-reinforcement for floor panels.
Figure 27:
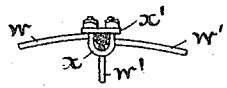
Fig. 27 is a fragmentary transverse section of the same on the plane 27 thereof.

Another simple form of thrust-framework for floor-panels, adapted to stand alone and involving nothing but plain reinforcing bars and common U-bolts, is shown in Fig. 26. Here the diagonal rods $w$ span the panel in pairs from column to column, as shown, and one rod $w'$ is shown bisecting each angle between the diagonals. Tension-rods here are not shown, and may be used or omitted as desired. The rods $w$ and $w'$ are, of course, bent convexly as in other cases, and at their meeting-points are secured to each other by U-bolts or stirrup-bolts $x$ having plates $x'$, or any other simple form of clip.

In Fig. 31 is shown a similar structure to that of Fig. 26, provided, however, with the rods $w'$ in pairs instead of single, and the whole united by clips or U-bolts $x$ at the meeting points as before.

My secondary reinforcing-cage is particularly adapted for use and serviceable in the case of other than plain cylindrical bars, and for deformed bars of any kind, in which, as is well known, the unequal radius of surface-curvature produces in the inclosing concrete unequally distributed stresses, which therefore tend to produce cracks in said concrete more readily than they are produced in round bars. In such cases therefore my secondary reinforcement-cage counteracts this effect and produces a redistribution of the stress which largely neutralizes the bad effect of corners and angles on the surface of the reinforcing-member.

By way of illustration there is shown for example in Fig. 32 a twisted bar $a'$, in Fig. 33 a corrugated bar $a^2$, and in Fig. 34 a T-bar $a^3$, in Fig. 35 a channel-bar $a^4$; surrounded in each case by a secondary reinforcing-cage $b$, which may be of any of the types illustrated in Figs. 1 to 10.

Structural shapes such as I-beams, T's and channels are also especially adaptable for use in connection with my compression-reinforcement-frame-construction. I have illustrated one example of this in the drawings, Figs. 36 and 37. This frame comprises eight T-bars $a^5$, $a^6$, extending radially from the center of the panel and united together by a gusset-plate $s^9$ by means of rivets $s^{10}$ or other suitable fastenings. Said bars are as shown in Fig. 37 concaved downwardly or arched, and to take up the end-thrust of or act as direct tension said bars, as well as reinforcements for the concrete, a set of tie-rods $u^3$ are provided. It will be seen that a tie-rod extends in two directions from the end of each intermediate arch-bar $a^6$ to the ends of the main arch-bars $a^5$ diagonally opposite, thus providing four V-shaped tie-rods. The ends of said tie-rods are structurally united to the ends of the main arch-bars, a convenient fastening consisting of a yoke-casting $u^4$ provided with set-screws $u^5$, said casting being notched in the form of a member having an eye through which the two arched ends are adapted to pass, and after drawing them up to the requisite tension, they are clamped fast by the set-screws $u^5$. The two rod-ends will then be as shown in the upper left-hand corner of Fig. 36, and to secure them in this position and prevent them from pulling out when the stress comes upon them, they are spread apart as shown in the other three corners of the drawing. The frame as thus far described is self-contained and complete for most purposes and the additional features shown are optional or to be used in certain cases only. The panel-frame may be partially set up and riveted in the shop, and the riveting and addition of the tie-rods completed on the job; after which the frame as a whole may be set in place and the concrete poured. It will be noted that the tension-bars $u^3$ form a very complete tension-reinforcement for the concrete in the panel; and they may also form, additionally, a support for other tension-bars laid upon them.

In some cases, I may provide additional tension-rods connecting the ends of oppositely extending bars $a^5$ and $a^6$, in the positions indicated by the dotted lines extending in the centers of said bars; and instead or in addition to such rods, I may employ girth tension-rods $u^6$, which as a whole extend around the panel-frame, passing over the ends of the main arch-bars $a^5$ and engaging in notches in the flanges thereof; each separate bar being L-shaped and screw-threaded at the ends and united to the adjacent bars by turnbuckles $u^7$. The ends of the intermediate arch-bars $a^6$ may also rest upon these tension-rods (which also act as tension-reinforcements for the concrete), the flanges thereof being notched out as shown at $a^7$, Fig. 37, to receive these rods $u^6$ as well as the rods $u^3$. If further support for the vertical stress upon the intermediate arch-bars $a^4$ is needed, it may be provided by secondary arched T-bars $a^8$, extending between adjacent corners of the panel and each connected with the end of the corresponding bars $a^6$ by a suitable suspender, as, for example a U-bolt $v^4$ extending under the bars $u^3$ and $u^6$ and having its ends passing through and bolted over a strap-plate $v^5$. The secondary arch-bars $a^8$ may have their ends joined to the ends of the main-bars $a^5$ by gusset-plates $s''$ to which both are riveted, as shown on the right of Fig. 36; or they may be independent bars as shown at the bottom of Fig. 36; or they may be arched frames like those shown in Figs. 20 and 21. The gusset-plates $s^9$, $s''$ are preferably perforated on various points of their area as shown, to give bending-necks for the concrete on their opposite sides.

In all these forms the secondary reinforcing-cage $b$, as shown on some of the rods in Fig. 24, will be a useful adjunct but is not essential to my invention.

Instead of a ring-spacer $z$ shown in Figs. 11 and 12, a simpler device for holding the secondary reinforcement in place consists of three wires $z^3$ twisted together as shown in Fig. 38. All of the three wires are somewhat longer than the diameter of the secondary-cage $b$ or $c$. The ends of one wire being twisted with one end of each of the other two wires and around the wire of the secondary-cage, the two free ends of said last-named wires are left open until the rod $a$ has been put in place and then they are twisted together and around the wire of the cage $c$ the same as the other two ends, forming a Y-shaped spider. It is clear that this is applicable to either the wire-mesh or the simple helical-wire form of cage, and especially so to the latter, as the wires $z^3$ can be manipulated between the coils of the wire.

While I have hereinabove shown the most improved forms of my invention, I wish it understood that not all of the features are essential thereto or necessarily made in the exact forms shown, but various changes and modifications in the constructions as herein shown may be made without departing from the spirit of my invention, and I wish it understood therefore that the latter is not otherwise limited than by the scope of my claims.

Having thus described my invention, what I claim as new and desire to secure by Letters Patent is:

1. In a structural member of reinforced concrete the combination of a plurality of main reinforcing members and a secondary reinforcing cage inclosing and closely paralleling the surface of certain of said individual members, whereby the secondary reinforcing cage incloses all of the concrete which is in immediate juxtaposition with the corresponding main reinforcing member, and binds it together into a unitary mass and gives it an increased hold on said reinforcing member.

2. In a structural member of reinforced concrete, the combination of a plurality of main reinforcing members and a secondary reinforcing cage inclosing and closely paralleling the surface of certain individual main members, said secondary members consisting of metallic wire of smaller diameter than said main reinforcing members.

3. In a structural member of reinforced concrete, the combination of a plurality of main reinforcing members and a secondary reinforcing cage inclosing and closely paralleling the surface of certain of said individual members, said cage comprising a wire mesh-work.

4. In a structural member of reinforced concrete subject to transverse or flexural stress, the combination of a plurality of metal reinforcing elements, each having surrounding it a cage constituting a secondary reinforcement; said cage having a wire extending helically around said element.

In witness whereof I have hereunto set my hand in presence of two witnesses.

RUDOLPH B. HARTMAN.

Witnesses:
P. E. McGee,
E. Forbes.